Dec. 30, 1958     F. J. KAEHNI     2,866,447
INTERNAL COMBUSTION ENGINES

Filed Feb. 27, 1956     2 Sheets-Sheet 1

INVENTOR.
Frank J. Kaehni
BY
HIS ATTORNEYS

Dec. 30, 1958     F. J. KAEHNI     2,866,447
INTERNAL COMBUSTION ENGINES
Filed Feb. 27, 1956     2 Sheets-Sheet 2

INVENTOR.
Frank J. Kaehni
BY
HIS ATTORNEYS

United States Patent Office 2,866,447
Patented Dec. 30, 1958

2,866,447

INTERNAL COMBUSTION ENGINES

Frank J. Kaehni, Cleveland, Ohio, assignor to The Economy Engine Company, Youngstown, Ohio, a corporation of Ohio Application February 27, 1956, Serial No. 567,777

12 Claims. (Cl. 123—191)

The present invention relates to internal combustion engines and the operation thereof. More specifically, it relates to a novel ignition system and method of operation which materially simplifies such engines and the ignition systems therefor and, at the same time, overcomes many of the known objectionable operating characteristics of such engines and eliminates some of the mechanical requirements for them.

This application is a continuation-in-part of copending application, Serial No. 414,997, filed March 9, 1954.

Many efforts have been made heretofore to improve internal combustion engines and the ignition systems therefor. Such efforts have been aimed at improving the apparatus and performance of such engines and simplifying and improving the conventional equipment required. Such efforts have followed many avenues of approach, including improvements in carburetion, improvements in fuels in order to overcome objectionable detonation, improvements in the handling of the fuel and air in the combustion chamber, and improvements in ignition systems so as to provide a more thorough and more rapid burning of the combustible mixture employed. Efforts have also been made to improve performance by modifying and particularly increasing the compression ratio in order to obtain maximum power under a given set of conditions. And, in regard to ignition systems, various automatic mechanisms have been devised for the purpose of supplying to the point of ignition a properly timed spark so as to provide combustion at the proper time to deliver maximum power output per unit of fuel delivered to the combustion chambers. Despite such efforts, the conventional ignition system, which has been in use many years and which requires spark plugs, an ignition coil, a condenser, a timer or magneto, a distributor and timing gearing still remains in use even though the lack of efficiency in the combustion effected thereby is well known to automotive engineers. Moreover, despite such efforts, the type of combustion which takes place in the combustion chambers or cylinders of the presently known engines is inefficient at both low and high speeds. According to the opinions of many experts, it is of such character that, due to the slowness of burning, it is necessary to provide additives of various types in even the best available fuels in order to prevent the occurrence of those conditions which result in objectionable knocking or detonation accompanied by an appreciable loss of power. Furthermore, the type of combustion obtained is of such character that objectionable deposits are formed in the combustion chambers and this problem is particularly acute where leaded fuels are used. And it is of such character that the maximum available amount of power is not delivered since the full effect of the explosive mixture is not transmitted to the pistons at the proper time.

Accordingly, one of the primary objectives of this invention is to provide an internal combustion engine and an ignition system therefor which overcomes most, if not all, of the objectionable features mentioned above and which provides proper timing without all of the paraphernalia employed heretofore in such engines to obtain a suitably timed igniting spark, more complete combustion, higher operating efficiency, substantially instantaneous combustion of the combustible mixture fed to the cylinders, materially lower poisonous gases in the exhausted products of combustion, a higher power output per unit of fuel supplied to the engine, and generally improved performance. It is also an objective of this invention to provide an engine which makes it possible to secure substantially instantaneous and substantially complete combustion at the proper time and with a reduction in or complete elimination of the objectionable lead and other additives which have been found necessary heretofore in order to prevent the formation of conditions resulting in detonation. It is a further objective to avoid the formation of objectionable deposits in the cylinders and to simplify the equipment required to obtain all of these results.

There are numerous factors which must be taken into account in the design of an engine in accordance with my invention. These factors will be discussed more in detail hereinafter. Generally speaking, this invention provides an engine and an ignition system therefor comprising one or more combustion chambers or cylinders, a piston movable in each cylinder, feeding mechanism for supplying the combustible mixture to each combustion chamber, means for exhausting products of combustion and the products of incomplete combustion from each combustion chamber, an opening in a wall of the cylinder beyond the outer end of the stroke of the piston, an ignition chamber or recess cooperating with said opening and in communication with the combustion chamber beyond the outermost end of the piston stroke, electrodes within the ignition chamber or recess spaced from the combustion chamber, and suitable means for providing a stream of sparks between the electrodes either continuously or during a substantial portion of the combined compression and power strokes of the piston.

One of the important features of the new combination provided by this invention is the ignition chamber or recess in which the continuous spark is formed for the purposes of generating combustion initially in the ignition chamber and then in the main combustion chamber of each cylinder. This recess or ignition chamber must be of suitable configuration, size and location to achieve proper operation, including both substantially instantaneous combustion and correct timing. The arrangement of the ignition chamber and that portion of the main combustion chamber adjacent thereto should be such as to permit the pressures therein to be approximately the same except, of course, when the initial ignition takes place in the ignition chamber, at which time materially greater pressures prevail in the ignition chamber. Of course, the various factors mentioned will vary in accordance with the particular engine embodying the invention. The compression ratio of the engine, the size of the cylinder and the piston operating therein, the volume in the main combustion chamber when the piston is at top dead center, the position of the intake and exhaust valves, and other factors have an important bearing on the most desirable configuration, size and position of the ignition chamber. Likewise, since this invention is applicable to either two cycle or four cycle engines, these factors will have to be modified in order to take care of the different operating conditions prevailing in such engines.

As indicated, the size of the ignition chamber or recess is important from the standpoint of achieving simultaneously good self-timing and substantially instantaneous combustion. I have found that recesses or ignition chambers having a diameter ranging from about ⅜" up to about 2" give satisfactory results. Of course, these are not absolute values, but are applicable to engines of normal size. However, if the engine is of such character that it has cylinders with larger bores than engines of the character discussed herein, the diameter of the recess will be increased appropriately. Stated in terms of volume, I have found that the ignition chamber or recess should have a cubical content within the range of approximately 1½ cubic centimeters up to as high as 28½ cubic centimeters for conventional engines. These values were determined through numerous tests on a Wisconsin stationary engine, and some have been confirmed by tests on other engines. Good results have been obtained on an eight cylinder Cadillac engine using an ignition chamber or recess having a diameter of approximately ⅜" and a volume of about 7 cc. and on other automobiles using recesses of somewhat similar sizes. In these tests with automobile engines, the existing spark plug opening was not enlarged and the conventional operation of the piston and valves, as employed for a regular timed spark, was not changed. Larger recesses would be preferable from the standpoint of maintaining cleaner cylinders, getting smoother operation, and spreading the flame in the main combustion chamber. The diameter and volume of the ignition chamber should be such that, when the fresh mixture of fuel and air is fed into it and compressed, the charge will be ignited and the inflamed mass projected into the main combustion chamber so as to ignite and burn substantially instantaneously the entire charge in the main combustion chamber of the cylinder. It spreads as it enters the main chamber and, hence, covers a large area simultaneously.

The configuration of the ignition chamber is likewise important. It should be substantially free of any lips or flanges or such obstructions as will interfere with the free flow of the combustible mixture into the ignition chamber, the free flow of the inflamed mixture from the ignition chamber into the main combustion chamber, and the egress of any residual products of combustion or products of incomplete combustion remaining in the ignition chamber after the explosion or power cycle.

Turbulence of the inflammable mixture adjacent the point of ignition is highly desirable as it tends to create more uniform firing conditions and, consequently, the ignition chamber may be provided with the means to create some turbulence, but, in general, I have found that no special means is required and that good uniform firing conditions are obtained with cylindrical ignition chambers. Of course, sufficient turbulence may be created in the main combustion chamber when the combustible mixture is fed thereto and this turbulent condition will be effective within the ignition chamber itself without the necessity of any special provisions therefor within the ignition chamber. In any event, it is important to avoid the use of any means for creating turbulence which is of such character as to adversely affect the ready ingress and egress of gases to and from the ignition chamber.

It is well known that the mixture fed to an internal combustion engine is not uniform. As a consequence, turbulence has been considered of value as it serves to minimize the vagaries of the mixture. Consequently, any turbulence created in either the main combustion chamber or in the ignition chamber will be of value, although, where my invention is employed, the use of the continuous spark will serve to minimize adverse effects flowing from non-uniformity of the mixture.

The location of the recess or ignition chamber with respect to the intake and exhaust valves and the piston is of some importance, particularly from the standpoint of the temperature prevailing at the ignition plugs. Generally speaking, it is preferable to avoid unduly high temperatures at the plugs as such temperatures have an effect on the operation of the engine. In some instances, it has been found desirable to provide cooling for the ignition chamber or recess in the Wisconsin engine when operating under heavy loads in order to obtain best results. If located directly over the piston, somewhere near the center of the cylinder, better results are obtained than when the ignition chamber is located to one side of the piston, although good results are obtained in either case. The somewhat improved results arising out of positioning the ignition chamber adjacent the center of the cylinder are believed to flow from the fact that the largest possible portion of the area of the compressed mixture in the main chamber can be blanketed with flame and from the fact that the total combustion time for inflaming all of the mixture in the cylinder is further reduced under such circumstances.

As stated, in accordance with this invention, a continuous spark is used to provide ignition; and tests have demonstrated that the continuous spark must be formed within the ignition chamber as distinguished from the main combustion chamber of the cylinder in order to get satisfactory results. The term "continuous spark" is employed herein to designate a series of individual sparks which are so close together as to form an arc. That is to say, the term is used to designate a compact series of individual sparks for each explosion of the engine. The continuous spark may, in reality, be continuous in the sense that the sparking is maintained at the electrodes at all times during the operation of the engine, i. e., throughout the two cycles of a two-cycle engine or throughout the four cycles of a four-cycle engine. However, it is not necessary that the continuous spark function throughout each cycle of operation. It is necessary, however, that a compact series of individual sparks be supplied for each explosion and, in order to accomplish this, the power source should supply the continuous spark throughout a substantial portion of the combined compression and power strokes. The essential factor is that a compact series of strong, hot sparks be supplied at such time as to provide for the delivery of a mass of the inflamed mixture to the main combustion chamber so that the inflaming of the mixture in the main combustion chamber will take place substantially instantaneously and at the proper time to deliver maximum power. This desired condition is realized when the maximum explosive effect of the inflamed mixture occurs at about the time the piston is at top dead center.

As indicated, it is important that the sparking between the electrodes takes place within the ignition chamber at a point spaced from the main combustion chamber in order to secure simultaneously proper self-timing and fast and complete combustion. The distance from the main combustion chamber to the point of sparking may be varied, depending upon other conditions, including the diameter and volume of the ignition chamber. This distance, depending upon other factors, may vary from about ½" to about 2½". As an example, we have found that, on an eight cylinder Cadillac with an ignition chamber approximately ⅜" in diameter, and a volume of approximately 7 cc., a spacing of 1¹⁵⁄₁₆" gave good results. Excellent results have also been obtained in the Wisconsin engine using spacings ranging from ½" to over 2". And like results have been obtained in Mercury, Lincoln and other engines with spacings within the above range. The compression ratios for various engines differ somewhat. The compression ratio for any particular engine may have an effect upon the distance from the point of sparking to the main combustion chamber.

As is well known, in the ordinary ignition system employed today, the spark gap, i. e., the spacing between the electrodes forming the spark, is of considerable importance. Generally, the conventional timed spark gap is approximately .025" to .035" and, if a proper spark gap is not maintained, an unsatisfactory operation is obtained. This is not the case, however, where the present invention is employed. The actual spark gap is not critical and may vary throughout a wide range. Highly satisfactory results have been obtained with this invention utilizing a spark gap ranging from .025" to .125". Larger or smaller spark gaps may be employed. A spark plug having a centrally disposed electrode may be used and the spark formed between the centrally disposed electrode and the skirt portion of the plug or the adjacent wall. This feature of the invention is of considerable importance as no difficulty is encountered with the fouling of the plugs. Moreover, if one part of the circular skirt or wall should become fouled, the spark will form between the centrally disposed electrode and another part of the skirt or wall. Furthermore, pitting or wear of the electrodes has no affect whatsoever on the functioning thereof, as in the case of the ordinary plugs in use today. If a particular area becomes pitted or worn, a continuous spark is formed between the centrally disposed electrode and another portion of the skirt or wall.

While an ordinary spark plug or the type described above having a centrally disposed electrode and an adjacent wall or skirt portion as the other electrode may be employed, if desired a special plug having two or more spaced electrodes may be used.

Any suitable mounting can be used for each spark plug, although I prefer to position the plug in a hole in the cylinder wall at a suitable point adjacent the piston when it is at the end of its compression stroke. The plug may be threaded in a hole in the cylinder wall or it may be mounted in a bushing positioned in the opening in the cylinder wall in which the power source for providing the continuous spark may be of any suitable type. A high voltage direct current source can be used. A vibrator type ignition coil likewise may be used. Also, an alternating current step-up transformer or any other suitable means for providing either a high voltage continuous or pulsating direct current or a high voltage alternating current may be used. The particular voltage required will depend upon various conditions, including the temperature and mixture of the gas in the ignition chamber, the pressures prevailing in the cylinder, the spacing and shape of the gap between the electrodes, and the type of engine to which the invention is applied. The minimum spark-over voltage is normally considered as being in the neighborhood of 300 to 400 volts, depending upon the nature and pressure of the gas. Any voltage in excess thereof capable of forming the continuous spark under the conditions prevailing can be used. I have employed potentials ranging from 2,000 volts to 35,000 volts with satisfactory results. In actual tests which I have run, potentials of 5,000 volts for both alternating current and direct current have been employed and results of the character described hereinafter obtained.

In the case of multiple cylinder engines, various arrangements of the power source may be employed. One vibrator coil can be used for each cylinder. A transformer for each cylinder may be employed. Also four transformers for an eight cylinder engine may be employed, each transformer feeding the necessary high potential to two cylinders. Even one transformer for the entire eight cylinders can be used if current limiting type condensers or resistors or inductors are interposed between the transformer and each plug. In such cases, the transformer must supply enough current for all cylinders and, due to the negative resistance characteristics of a spark, enough positive resistance or reactance must be used in each circuit to cause all of the plugs to spark simultaneously. Also, a single transformer can be employed for as many as eight cylinders without the use of current limiting means if a distributor is employed for distributing a stream of sparks to each cylinder. It is merely necessary to provide any suitable type of power source which will supply a continuous untimed spark to each cylinder. The power source preferably provides a high frequency current in the neighborhood of 400 to 800 cycles.

In the operation of an engine embodying this invention, a continuous spark as described above is fed to the spark plug in each ignition chamber. The fuel and air mixture is fed to the main combustion chamber of each cylinder at the proper time and, on the compression stroke, is compressed. This mixture is compressed in both the main combustion chamber and in the communicating ignition chamber. When the proper pressure is achieved, the continuous spark ignites the mixture in the ignition chamber and the mass of flame from the ignition chamber is forcibly projected into the main combustion chamber and the main charge is inflamed substantially instantaneously so as to deliver power to the piston. The spark is untimed, but, by this system, automatic timing is achieved. This automatic or self-timing evidently is obtained by the manner in which the ignition chamber or recess and the main combustion chamber coordinate the proper pressure conditions with the movement of the piston. The spacing of the point of sparking with respect to the main combustion chamber and the proper proportioning of the ignition chamber with respect to the main combustion chamber are also important factors in obtaining this automatic timing. In any event, the combination described above provides an automatic timing and substantially instantaneous combustion of the inflammable mixture at the proper time to give maximum output of power, as is evidenced by those data set forth hereinafter.

An important feature of this invention, which doubtless bears a relationship to the automatic or self-timing, is that a sufficient mass of flame is discharged from the ignition chamber into the main combustion chamber to provide substantially instantaneous and substantially complete combustion of the combustible gases. This mass of flame spreads and ignites a large area of the gases in the main combustion chamber, leaving only a small area, if any, in the main combustion chamber over which the flame must advance. The force of the inflamed mass entering the main combustion chamber also contributes to the rapid and substantially complete combustion obtained.

Although there appears to be no absolute relationship between the diameter of the recess or ignition chamber, at the mouth thereof, i. e., the point where it joins the main combustion chamber, and the diameter of the piston operating in the main chamber, it is desirable that the mouth be of substantial size with respect to the piston in order that the mass of inflamed gas passing into the main chamber will strike the combustible gases in the main chamber over an appreciable area. For example, I have found that, in an engine with a piston diameter of 2½", good results can be obtained with a recess having a diameter of about 1½". Such a recess, of course, provides for the striking of a large area of combustible gases in the main chamber with the inflamed gases projected from the ignition chamber. As the inflamed gases are ejected, they will, of course, spread out somewhat with the result that an extremely large portion, if not all, the area above the piston will be hit with this flame mass. Recesses having a diameter of ½" with a piston diameter of 2½" will work satisfactorily, as tests have demonstrated, but even in such instances substantially instantaneous combustion of the inflammable gases in the chamber is obtained by hitting them with the mass of flame coming from the recess under pressure. Likewise, recesses as small as ⅜" in diameter have been found to produce good results in an engine having a piston diameter of 3 13/16".

By inflaming, at the proper time, a substantial mass of a combustible mixture in an ignition chamber or recess communicating with the main combustion chamber and discharging and distributing the inflamed mass, under the pressures generated by the burning, into the main combustion chamber at the proper time, the burning of the combustible gases in the main chamber takes place substantially instantaneously and the combustion is substantially complete. This explosion in the main chamber occurs at the proper instant, as regards the movement of the piston, to deliver a maximum of power from the gases burned. The explosive effect of the burning of the gases in the main chamber is delivered to the piston when it is at or near the end of its compression stroke.

The actual phenomena taking place which results in automatic timing so that irrespective of the speed of operation the explosion in the main chamber takes place at the proper time with respect to the movement of the piston are somewhat obscure. However, I believe that it is due primarily to the proper shaping and proportioning of the ignition chamber so that the gases will move freely between the ignition chamber and main chamber and also to proper positioning of the electrodes within the ignition chamber so that the combustion in the main chamber will occur when the piston has developed within the cylinder and ignition chamber pressures closely approximating the maximum pressures developed under the particular conditions prevailing in the engine.

The present invention provides many advantages over the conventional engines and the known ignition systems therefor. Although others will be apparent to those skilled in the art, those described hereinafter will suffice to indicate the far-reaching effects of this invention.

One of the major advantages resides in the simplicity of the engine and ignition system. The timer, timer shaft, timer gearing and distributor are completely eliminated and the system otherwise simplified. Conventional spark plugs may be used although, if desired, plugs of simplified construction can be used because the length of the spark gap is not critical where my system is employed. The conventional distributor is eliminated and the conventional spark plugs, ignition coils and condensers are eliminated and simplified spark plugs and simplified spark producing equipment substituted in lieu thereof.

Exhaust temperatures are reduced appreciably. In tests which have been run on the Wisconsin stationary engine, the temperature of the exhaust gases has been reduced from a minimum of 70° to as much as 270°. In practically all of the tests run to date, a material reduction in exhaust temperatures has been experienced when employing this invention as compared with a like operation employing the conventional firing system. The extent of this reduction in exhaust temperatures depends somewhat on the particular conditions of operation.

An increase in operating speed for a given set of conditions has been obtained. For example, in tests made in which the engine was first operated with the conventional ignition system and was then changed to operate in accordance with this invention, all other conditions remaining the same, the speed of the engine materially increased.

A much leaner mixture of fuel and air can be employed. In tests which have been made, the amount of fuel consumed by the engine utilizing this invention has been reduced in amounts ranging from about 5% to over 30%, as compared with the amount used in the same period of time under the same operating conditions when employing the conventional type ignition. Moreover, when this invention is employed, the amount of fuel consumed per unit of power developed by the engine is materially reduced. In tests which have been run on the Wisconsin stationary engine, this reduction in fuel consumed per unit of power developed ranges from 5% to over 50%, as compared with the amount consumed when using the ordinary conventional system.

More complete combination of the combustible gases is achieved and appreciably less carbon monoxide is present in the exhaust gases. This has been demonstrated by numerous tests which have also shown that, when employing this invention, there is less wasted fuel in the exhaust gases. In addition, less carbon and other deposits are formed in the combustion zone and there is no fouling of the plugs.

As already indicated, the spark gap is not critical where this invention is employed and the distance between electrodes may vary over a wide range. In operation, no adjustment of the spark gap is necessary, whereas, in the conventional ignition system, great care must be taken to obtain and maintain a proper spark gap.

Another important advantage resides in the fact that detonation or knocking is substantially eliminated. This is true irrespective of whether the fuel has lead or some other additive in it for the prevention of the forming of pro-knock materials.

Another important advantage resides in the fact that the cylinder walls are kept relatively clean and free of objectionable deposits.

Another advantage resides in the fact that the timing is automatic and, as a consequence, the automatic spark adjusting mechanisms conventionally employed are eliminated.

Another advantage resides in the fact that more positive starting is obtained.

Thus it will be seen that this invention provides tremendous advantages over the conventional engines and ignition systems.

In the accompanying drawings are shown, for purposes of illustrations only, several preferred embodiments of this invention.

Figure 1:
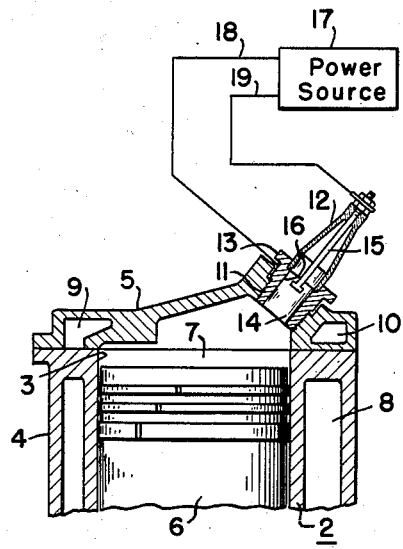
Figure 1 is a sectional view through one cylinder of a single or multiple cylinder engine showing the invention applied thereto.
Figure 2:
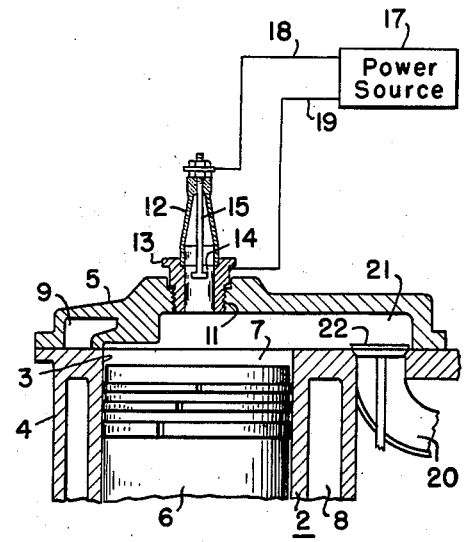
Figure 2 is a view similar to Figure 1, with the spark plug positioned somewhat differently and showing an intake valve.

Referring first to Figure 1, there is illustrated a part of an engine indicated generally by the reference character 2. The cylinder 3 has a side wall 4 and an end wall 5. A piston 6 of conventional type is positioned within the cylinder in the main combustion chamber 7 and is reciprocated in the cylinder by the conventional crankshaft and connecting link (not shown). The side wall of the cylinder is provided with a water cooling recess 8 and water cooling recesses 9 and 10 are provided in the head or end wall 5. An opening 11 is provided in the end wall of the cylinder adjacent one edge or, as illustrated in Figure 2, it may be positioned adjacent the center line of the piston. A spark plug 12 is mounted in the opening 11, the skirt portion 13 being threaded into the opening. The end of the plug is hollow and forms a recess or ignition chamber 14 in which the continuous spark is formed. This ignition chamber or recess is in communication with the main combustion chamber. The spark plug shown has a centrally disposed electrode 15, which extends downwardly through the center of the plug a suitable distance to provide the desired spacing of the continuous spark from the main combustion chamber. The side wall 16 of the skirt portion of the plug in this embodiment forms the other electrode and the continuous spark is formed between this wall and the centrally disposed electrode 15. The skirt portion 13 is in electrical contact with the cylinder wall and, consequently, either the skirt portion of the plug or the cylinder wall may be connected to ground or to the power source indicated generally by the reference character 17 by means of a lead 18. The other side of the power source is connected by a lead 19 to the top of the plug which is in electrical connection with the centrally disposed electrode 15. This power source 17 may supply either a high voltage direct current or a high voltage alternating current. A vibrator type ignition coil, an alternating current step-up transformer or any suitable high voltage direct or alternating current power source may be used.

As shown in the drawings, the end of the electrode 15 is positioned in the ignition chamber 14, but is spaced from but nevertheless in communication with the main combustion chamber 7. Preferably this spacing from the combustion chamber within the ignition chamber is, as stated earlier, about ½" to about 2".

Referring to Figure 2, a single cylinder of either a single or multiple cylinder engine is illustrated. The cylinder illustrated is similar to that illustrated in Figure 1, but, in this instance, the spark plug for forming the continuous spark is shown as positioned substantially centrally with respect to the piston. However, in this embodiment, I have shown an inlet 20 connected to a passageway 21 for supplying the combustible mixture to the cylinder. An inlet valve 22 is likewise illustrated for controlling the flow of fuel and air mixture into the main combustion chamber.

Figure 3:
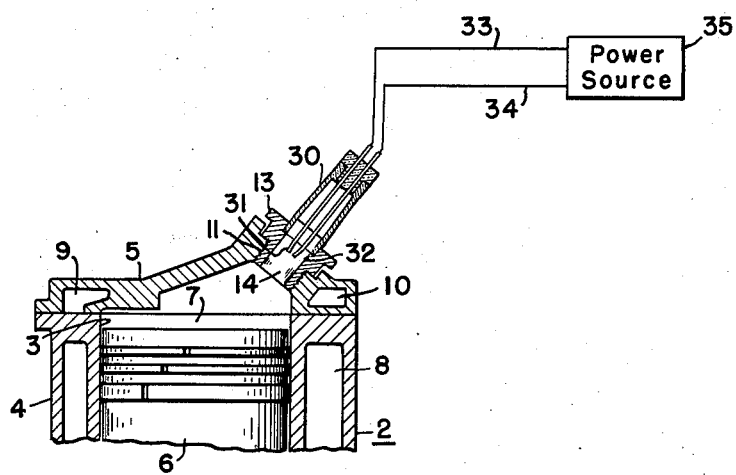
Figure 3 is a view similar to Figure 1, except that it illustrates a somewhat different type of spark plug.

Referring to the embodiment shown in Figure 3, the cylinder is like that illustrated in Figure 1, but a somewhat different type of spark plug is shown. In this embodiment, the spark plug 30 is provided with spaced electrodes 31 and 32, which are connected respectively by leads 33 and 34 to a power source 35. The two electrodes 31 and 32, as illustrated, are spaced apart with respect to each other and the point of sparking, namely, the lower end portions of the electrodes, is within the ignition chamber 14 and spaced a suitable distance from the combustion chamber.

Figure 4:
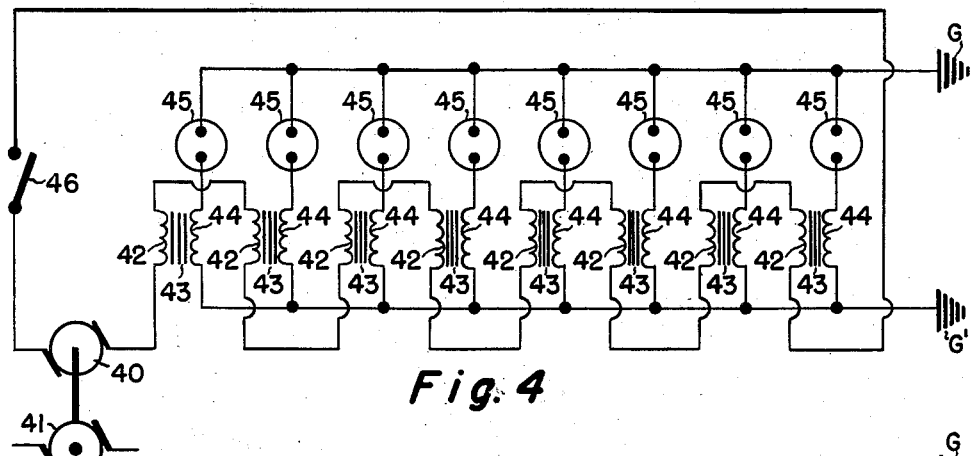
Figure 4 is an electrical diagram illustrating one form of power source for supplying the spark to the spark plugs.

Referring now to Figure 4, I have illustrated a suitable power source for supplying a continuous spark to each of eight cylinders. In this embodiment, an alternating current generator 40 may be driven by a motor 41 or by the engine itself. The alternating current generator supplies low voltage alternating current to the primary coil 42 of each of the transformers 43. One side of each secondary coil 44 of each of the transformers 43 is connected to one of the electrodes of a spark plug. The spark plugs are indicated by the reference character 45. The other side of each spark plug is connected to ground G. The other side of each secondary coil is likewise connected to ground G'. A control switch 46 is interposed in the circuit from the source of low voltage alternating current. With this system, the low voltage alternating current is stepped up to a suitable high potential by the transformers and a high potential spark is supplied to each of the plugs.

Figure 5:
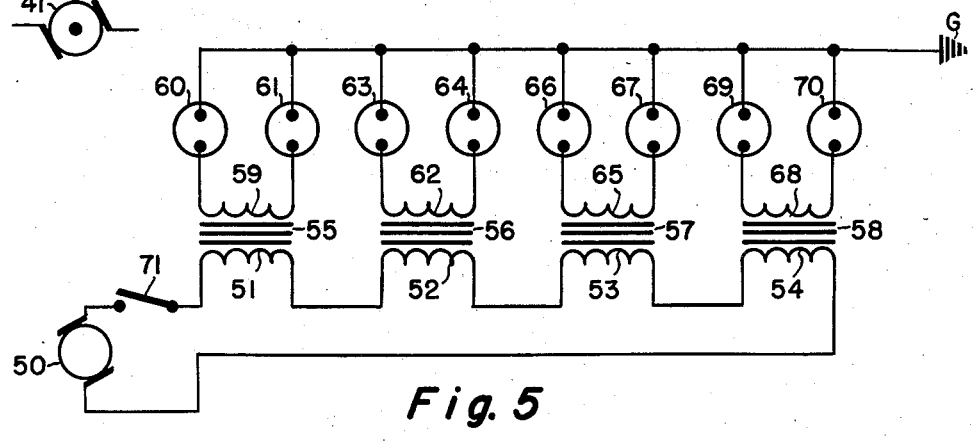
Figure 5 is an electrical diagram showing another power source.

In Figure 5, I have illustrated another power source which may be employed. In this system, a generator 50 forms the source of low potential alternating current. It is connected to the primary coils 51, 52, 53 and 54 of transformers 55, 56, 57 and 58. Each transformer provides the spark for two spark plugs. The secondary 59 of the transformer 55 is connected to the plugs 60 and 61. The secondary 62 of the transformer 56 is connected to the plugs 63 and 64. The secondary 65 of the transformer 57 is connected to the plugs 66 and 67. The secondary 68 of the transformer 58 is connected to the plugs 69 and 70. The other side of each of the plugs is connected to ground G. In this system, a control switch 71 is interposed in the circuit. The generator may be driven separately or it may be driven through appropriate connection to the engine for which the ignition is being provided.

Figure 6:
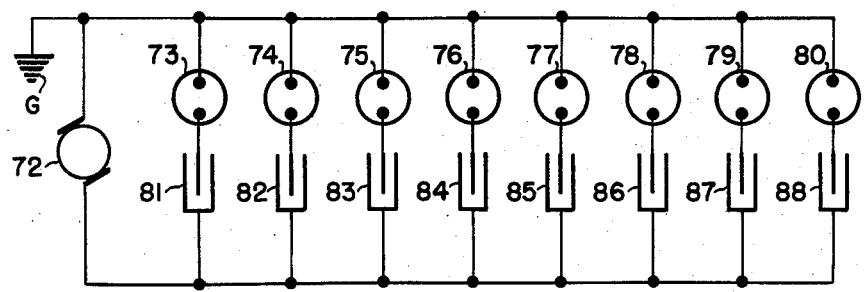
Figure 6 is an electrical diagram illustrating a still further type of power source which may be used.

In Figure 6, I have shown a further power source which may be used. In this power source, a high voltage alternating current generator 72 is employed. One side of the generator is connected to each of the plugs 73, 74, 75, 76, 77, 78, 79 and 80. The other side is connected to capacitances, inductors or resistances 81, 82, 83, 84, 85, 86, 87, and 88, which, in turn, are connected to the other side of each plug 73 to 80, inclusive. The system is grounded by connection to the ground G.

While I have illustrated alternating current systems in the drawings, it will be apparent that high voltage direct current can be used and that various electrical arrangements may be employed to supply either the high voltage direct current or the high voltage alternating current to each of the plugs, and it will also be apparent to those skilled in the art that a single step-up transformer may be used and a distributor or interrupters employed for suitably distributing the sparks to the electrodes of the spark plugs. It is merely necessary to provide a continuous stream of sparks throughout the entire cycle or throughout a substantial portion of the combined compression and power strokes.

It will be apparent to those skilled in the art that my invention may assume various other embodiments and may be employed in gasoline, diesel or semi-diesel engines and may be employed where a fuel injection system is employed instead of the conventional system employing a carburetor. While I have described and illustrated several embodiments of my invention, it will be understood that this invention is not limited thereto but may be otherwise practiced or embodied within the scope of the appended claims.

I claim:

1. In an internal combustion engine, the combination of a main combustion chamber having side and end walls, a walled ignition chamber adjacent said main combustion chamber and communicating therewith, a member positioned at least partially within said ignition chamber and forming an electrode therein, a second member adjacent said first member in said ignition chamber but spaced therefrom and forming a second electrode, and a power source electrically connected with said electrodes and adapted to provide a continuous spark therebetween, said electrodes being so positioned as to form the continuous spark within the ignition chamber at a point spaced from the main combustion chamber, said main combustion chamber and said ignition chamber being arranged so as to provide substantially unobstructed ingress of gases from the combustion chamber into said ignition chamber and substantially unobstructed egress of gases from the ignition chamber into the combustion chamber, whereby a rich mixture in the ignition chamber is assured and entrapment of products of combustion within said ignition chamber is avoided.

2. In an internal combustion engine, the combination of a main combustion chamber having side and end walls, a walled ignition chamber adjacent said main combustion chamber having a mouth at one end thereof communicating with said combustion chamber, an electrode positioned at least partially within said ignition chamber, a member forming a second electrode in the ignition chamber, said member being spaced from the first-mentioned electrode, and a power source electrically connected with said electrodes adapted and arranged to provide a high potential continuous spark between the electrodes, said electrodes being arranged so as to form the continuous spark within the ignition chamber at a point spaced from the mouth thereof, the mouth portion of said ignition chamber being of such character as to provide a substantially unobstructed flow of gases between the main combustion chamber and the ignition chamber, whereby a rich mixture in the ignition chamber is assured and entrapment of products of combustion within said ignition chamber is avoided.

3. The combination as claimed in claim 1 in which the ignition chamber communicates with the main combustion chamber through an end wall thereof.

4. The combination as claimed in claim 1 in which a wall of said ignition chamber constitutes one of the electrodes.

5. In an internal combustion engine, the combination of a main combustion chamber having side and end walls, a piston adapted to reciprocate within said combustion chamber, a walled ignition chamber adjacent said main combustion chamber and communicating therewith at a point beyond the end of the stroke of said piston, means within said ignition chamber forming a pair of electrodes, and a power source electrically connected with said electrodes and adapted to provide a continuous spark between the electrodes, said electrodes being so positioned within the ignition chamber as to cause said continuous spark to be formed at a point spaced from the point of communication between the ignition and combustion chambers, said ignition and combustion chambers at the point of communication being arranged to provide substantially unobstructed passage of gases between said chambers, whereby entrapment of products of combustion within said ignition chamber is avoided.

6. In an internal combustion engine, the combination of a main combustion chamber having side and end walls, a piston adapted to reciprocate within said combustion chamber, a walled ignition chamber adjacent said main combustion chamber and communicating therewith at a point beyond the end of the stroke of said piston, said ignition and combustion chambers at the point of communication being arranged to provide substantially unobstructed passage of gases between said chambers, whereby entrapment of products of combustion in the ignition chamber is effectively avoided, means within said ignition chamber forming a pair of electrodes, and a power source electrically connected with said electrodes and adapted to provide a continuous spark between the electrodes, said electrodes being so positioned within the ignition chamber as to cause said continuous spark to be formed at a point spaced from the point of communication between the ignition and combustion chambers approximately ½" to 2½".

7. In an internal combustion engine, the combination of a main combustion chamber having side and end walls, a piston adapted to reciprocate within said combustion chamber, a walled ignition chamber adjacent said main combustion chamber and communicating therewith at a point beyond the end of the stroke of said piston, said ignition and combustion chambers at the point of communication being arranged to provide substantially unobstructed passage of gases between said chambers, whereby entrapment of products of combustion in the ignition chamber is effectively avoided, means within said ignition chamber forming a pair of electrodes, and a power source electrically connected with said electrodes and adapted to provide a continuous spark between the electrodes, said electrodes being so positioned within the ignition chamber as to cause said continuous spark to be formed at a point spaced from the point of communication between the ignition and combustion chambers approximately ½" to 2½" and said ignition chamber having a diameter of about ⅜" to 2".

8. In an internal combustion engine, the combination of a main combustion chamber having side and end walls, a walled ignition chamber adjacent said main combustion chamber and communicating therewith, means within said ignition chamber forming a pair of spaced electrodes, and a power source electrically connected with said electrodes and adapted to provide a continuous spark therebetween within said ignition chamber, said electrodes being positioned so that the spark therebetween is formed at a distance of from about ½" to 2½" away from the point of communication between said main combustion chamber and said ignition chamber, said main combustion chamber and said ignition chamber at the point of communication being arranged so as to provide substantially unobstructed passage of gases between the chambers, whereby entrapment of products of combustion within said ignition chamber is avoided.

9. In an internal combustion engine, the combination of a main combustion chamber having side and end walls, a piston adapted to reciprocate within said main combustion chamber, an ignition chamber adjacent said main combustion chamber and communicating therewith at a point beyond the end of the stroke of said piston, means within said ignition chamber forming a pair of spaced electrodes, said main combustion chamber and said ignition chamber being so arranged at the point of communication as to provide substantially unobstructed passage of gases between said chambers, whereby any appreciable entrapment of products of combustion within said ignition chamber is avoided, and a high potential power source electrically connected with said electrodes and arranged to provide a continuous stream of sparks between said electrodes during at least a substantial part of the combined compression and power strokes of the piston, said electrodes being so arranged within said ignition chamber as to cause the sparks to pass therebetween at a point spaced from the point of communication between said chambers.

10. In an internal combustion engine, the combination of a main combustion chamber having side and end walls, a piston adapted to reciprocate within said main combustion chamber, an ignition chamber adjacent said main combustion chamber and communicating therewith at a point beyond the end of the stroke of said piston, means within said ignition chamber forming a pair of spaced electrodes, said main combustion chamber and said ignition chamber being so arranged at the point of communication as to provide substantially unobstructed passage of gases between said chambers, whereby any appreciable entrapment of products of combustion within said ignition chamber is avoided, and a high potential power source electrically connected with said electrodes and arranged to provide a continuous stream of sparks between said electrodes during at least a substantial part of the combined compression and power strokes of the piston, said electrodes being so arranged within said ignition chamber as to form said sparks at a point spaced approximately ½" to 2½" from the point of communication between said chambers.

11. In an internal combustion engine, the combination of a main combustion chamber having side and end walls, a walled ignition chamber adjacent said main combustion chamber and communicating therewith, means within said ignition chamber forming a pair of electrodes, at least one of said electrodes being spaced inwardly of the ignition chamber an appreciable distance from the point of communication between the two chambers, said chambers at the point of communication being so constructed and arranged as to provide substantially unobstructed ingress of gases from the combustion chamber into the ignition chamber to a point adjacent said electrodes and substantially unobstructed egress of gases from a point in said second chamber adjacent said electrodes into the combustion chamber, whereby entrapment of any substantial amount of products of combustion within said ignition chamber is avoided, a high potential power source electrically connected with said electrodes and arranged to provide a continuous spark between said electrodes, and means for supplying combustible gases to said main combustion chamber and said ignition chamber, said ignition chamber being of such size with respect to the main combustion chamber that combustible gases entering the ignition chamber and ignited by said continuous spark are projected into the combustion chamber in such manner as to impinge upon and substantially instantaneously ignite a large portion of the combustible gases within said combustion chamber.

12. In an internal combustion engine, the combination of a main combustion chamber having side and end walls, a walled ignition chamber adjacent said main combustion chamber and communicating therewith, a member positioned at least partially within said ignition chamber and forming an electrode therein, a second member adjacent said first member in said ignition chamber but spaced therefrom and forming a second electrode, and a power source electrically connected with said electrodes and adapted to provide a continuous spark therebetween, said electrodes being so positioned as to form the continuous spark within the ignition chamber at a point spaced from the main combustion chamber, said main combustion chamber and said ignition chamber being arranged so as to provide substantially unobstructed ingress of gases from the combustion chamber into said ignition chamber and substantially unobstructed egress of gases from the ignition chamber into the combustion chamber, whereby entrapment of products of combustion within said ignition chamber is avoided, said ignition chamber being of such size in relation to the main combustion chamber as to deliver a mass of inflamed gases to the main combustion chamber of such size to cover a large portion of the body of gases in the main combustion chamber, said electrodes being arranged to provide a continuous spark at a point approximately ½" to 2½" within the ignition chamber.

References Cited in the file of this patent

UNITED STATES PATENTS

| | | |
|---|---|---|
| 1,393,636 | Murray | Oct. 11, 1921 |
| 1,559,411 | Espinosa | Oct. 27, 1925 |
| 1,758,829 | Gilbert | May 13, 1930 |
| 2,025,202 | Harper | Dec. 24, 1935 |
| 2,152,037 | Fuller | Mar. 28, 1939 |
| 2,238,852 | Regar | Apr. 15, 1941 |
| 2,456,080 | Wu Pe | Dec. 14, 1948 |
| 2,708,428 | Fisher | May 17, 1955 |

FOREIGN PATENTS

| | | |
|---|---|---|
| 586,737 | France | Apr. 2, 1925 |
| 624,822 | France | July 27, 1927 |
| 466,694 | Great Britain | June 2, 1937 |

UNITED STATES PATENT OFFICE

CERTIFICATE OF CORRECTION

Patent No. 2,866,447                                   December 30, 1958

Frank J. Kaehni

It is hereby certified that error appears in the printed specification of the above numbered patent requiring correction and that the said Letters Patent should read as corrected below.

Column 6, line 24, for "combusion" read -- combustion --; column 7, line 38, beginning with "The conventional" strike out all to and including "thereof." in line 42; line 74, for "combination" read -- combustion --.

Signed and sealed this 14th day of April 1959.

(SEAL)
Attest:

KARL H. AXLINE                                                      ROBERT C. WATSON
Attesting Officer                                           Commissioner of Patents